(12) United States Patent
Bhakta et al.

(10) Patent No.: US 10,317,032 B2
(45) Date of Patent: Jun. 11, 2019

(54) HEADLAMP WITH DIGITAL MICROMIRROR DEVICE AND STATIC REFLECTOR

(71) Applicant: TEXAS INSTRUMENTS INCORPORATED, Dallas, TX (US)

(72) Inventors: Vikrant R. Bhakta, Dallas, TX (US); Jeff Farris, Flower Mound, TX (US); Stephen A. Shaw, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/811,752

(22) Filed: Nov. 14, 2017

(65) Prior Publication Data

US 2018/0259149 A1   Sep. 13, 2018

Related U.S. Application Data

(60) Provisional application No. 62/469,767, filed on Mar. 10, 2017.

(51) Int. Cl.

| | |
|---|---|
| *F21V 1/00* | (2006.01) |
| *F21S 41/36* | (2018.01) |
| *B60Q 1/08* | (2006.01) |
| *F21S 41/33* | (2018.01) |
| *F21S 41/675* | (2018.01) |
| *B60Q 1/00* | (2006.01) |
| *B60Q 1/14* | (2006.01) |

(Continued)

(52) U.S. Cl.
CPC ............ *F21S 41/36* (2018.01); *B60Q 1/0023* (2013.01); *B60Q 1/085* (2013.01); *B60Q 1/143* (2013.01); *F21S 41/141* (2018.01); *F21S 41/321* (2018.01); *F21S 41/336* (2018.01); *F21S 41/337* (2018.01); *F21S 41/663* (2018.01); *F21S 41/675* (2018.01); *F21S 45/10* (2018.01); *B60Q 2300/146* (2013.01); *B60Q 2300/31* (2013.01); *B60Q 2300/314* (2013.01)

(58) Field of Classification Search
CPC ........ F21S 41/36; F21S 41/365; F21S 41/143; F21S 41/43; F21S 41/645; F21S 41/675; F21S 41/14; F21S 41/147; F21S 41/16; F21S 41/25; B60R 1/12; F21Y 2115/10
USPC ........................................................ 362/466
See application file for complete search history.

(56) References Cited

U.S. PATENT DOCUMENTS

| | | | |
|---|---|---|---|
| 2002/0196636 A1 | 12/2002 | Dassanayake et al. | |
| 2008/0239742 A1* | 10/2008 | Nakada ................. | F21S 41/147 362/507 |

(Continued)

FOREIGN PATENT DOCUMENTS

JP     2016009608     1/2016

OTHER PUBLICATIONS

International Search Report for PCT Application No. PCT/US2018/021258, dated Jun. 21, 2018 (2 pages).

*Primary Examiner* — Thien M Le
(74) *Attorney, Agent, or Firm* — Michael A. Davis, Jr.; Charles A. Brill; Frank D. Cimino

(57) ABSTRACT

A headlamp includes a digital micromirror device (DMD) reflector, a light source, and projection optics. The DMD reflector includes a DMD and a static reflector disposed on a plurality of sides of the DMD. The light source is disposed to illuminate the DMD reflector. The projection optics are configured to project light reflected by the DMD and light reflected by the static reflector via a same lens system.

21 Claims, 6 Drawing Sheets

(51) Int. Cl.
*F21S 41/141* (2018.01)
*F21S 41/32* (2018.01)
*F21S 41/663* (2018.01)
*F21S 45/10* (2018.01)

(56) References Cited

U.S. PATENT DOCUMENTS

| | | | |
|---|---|---|---|
| 2009/0096937 A1* | 4/2009 | Bauer | B60R 1/12 |
| | | | 348/739 |
| 2010/0097699 A1* | 4/2010 | Destain | G03B 21/60 |
| | | | 359/454 |
| 2014/0071704 A1* | 3/2014 | Yagi | F21S 41/645 |
| | | | 362/516 |
| 2015/0160454 A1 | 6/2015 | Bhakta | |
| 2015/0191115 A1* | 7/2015 | Yamamura | F21S 48/1731 |
| | | | 315/82 |
| 2015/0285458 A1 | 10/2015 | Dassanayake et al. | |
| 2015/0377430 A1 | 12/2015 | Bhakta | |
| 2015/0377442 A1 | 12/2015 | Bhakta et al. | |
| 2016/0290584 A1* | 10/2016 | Nomura | H01S 5/005 |
| 2016/0347237 A1 | 12/2016 | Bhakta et al. | |
| 2018/0216811 A1* | 8/2018 | Fukakusa | H01S 5/005 |

\* cited by examiner

HEADLAMP WITH DIGITAL MICROMIRROR DEVICE AND STATIC REFLECTOR

CROSS REFERENCE TO RELATED APPLICATION(S)

This application claims priority to U.S. Provisional Application Ser. No. 62/469,767 entitled "DMD With Static Reflector Architecture For Headlamp" filed Mar. 10, 2017, and incorporated herein by reference.

BACKGROUND

Glare-free forward illumination has become an important goal to improve night driving safety for vehicles. Automotive headlamps with patterned beams have been proposed to dynamically illuminate the field of view. In some applications, the headlamp beam pattern may be modified based on data from a variety of sources, including forward looking sensors, indicators or beacons located on the roadway, with positional or traffic data from GPS receivers, or even attitude sensors. Headlamp systems using dynamic beam adaptation potentially enable a number of applications, such as: glare-free high beams; pedestrian face masking; animal spot lighting; target painting; reflection reduction; vehicle attitude compensation; adaptive front beam steering; and projecting information on the roadway

SUMMARY

A headlamp includes a digital micromirror device (DMD) reflector, a light source, and projection optics. The DMD reflector includes a DMD and a static reflector disposed on a plurality of sides of the DMD. The light source is disposed to illuminate the DMD reflector. The projection optics are configured to project light reflected by the DMD and light reflected by the static reflector via a same lens system. The headlamp may be an automotive headlamp1

In another embodiment, a headlamp includes a DMD reflector and a light source. The DMD reflector includes a DMD and a static reflector. The static reflector is disposed on a plurality of sides of the DMD. The static reflector includes a fixed portion, a mobile portion, and an actuator. The actuator is configured to move the mobile portion from a first position to a second position. The light source is disposed to illuminate the DMD reflector. The headlamp may be an automotive headlamp.

In a further embodiment, a lamp reflector includes a DMD and a static reflector. The static reflector is disposed on a plurality of sides of the DMD. The static reflector includes a static reflective grating. The tilt angle of the static reflective grating is at least as large as a tilt angle of mirrors of the DMD.

In a yet further embodiment, a headlamp includes a reflector module, a light source, and projection optics. The reflector module includes a spatial light modulator, a static reflector, a light source, and projection optics. The static reflector is disposed on a plurality of sides of the spatial light modulator. The light source is disposed to illuminate the reflector module. The projection optics are configured to project light from the spatial light modulator and light reflected by the static reflector via a same lens system. The headlamp may be an automotive headlamp.

BRIEF DESCRIPTION OF THE DRAWINGS

For a detailed description of various examples, reference will now be made to the accompanying drawings in which.

DETAILED DESCRIPTION

Figure 1:
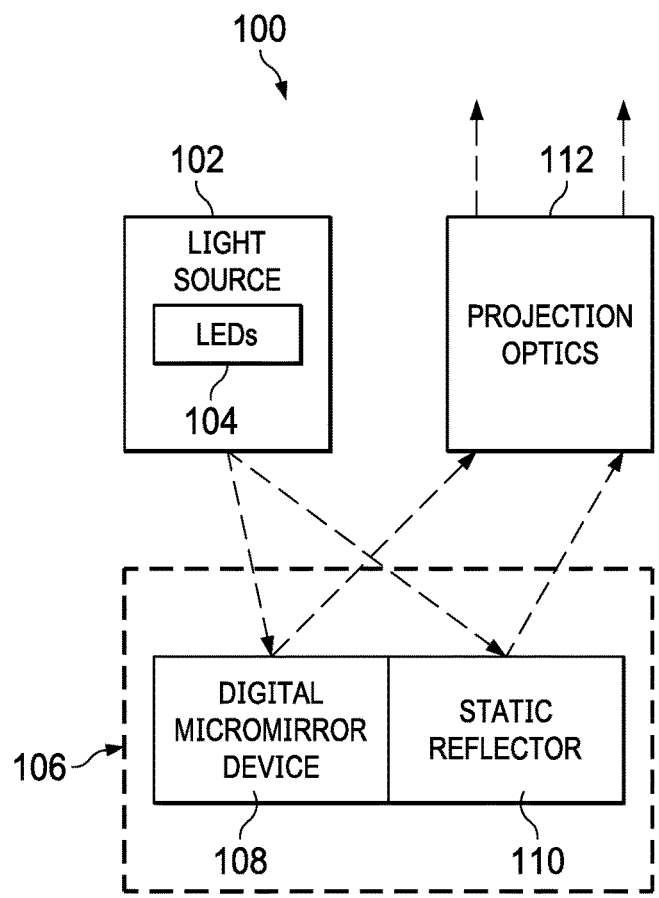
FIG. 1 shows a block diagram of an automotive headlamp in accordance with various embodiments.

Certain terms are used throughout the following description and claims to refer to particular system components. As one skilled in the art will appreciate, different parties may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections.

Some automotive headlamps provide pixel level control of the high beam using a matrix of light emitting diodes (LEDs) or using a digital micromirror device (DMD). The higher resolution of the DMD allows the DMD based headlamp to provide much finer control of the high beam profile than the LED matrix. However, the DMD is a semiconductor device and is subject to the typical limitations of semiconductor technology. For example, as with semiconductor devices generally, the temperature range over which a DMD operates is limited. To accommodate this limitation of the DMD, conventional DMD based headlamps may include thermal control systems to attempt to regulate the temperature of the DMD, or may include a backup lighting system to operate in place of the DMD should the temperature of the DMD exceed operating specifications. Both of these options can add significant cost and complexity to the headlamp. Additionally, conventional DMD based headlamps may include dedicated low-beam and/or mid-beam light lighting systems in addition to the DMD high beam system, which again add cost and complexity to the headlamp.

Embodiments of the present disclosure include a DMD based automotive headlamp that is operable beyond the specified temperature range of the DMD device without use of complex temperature control systems or backup lighting systems. Embodiments also allow for low beam generation without inclusion of a dedicated low beam lighting system. The headlamps disclosed herein include a static reflector disposed on multiple sides of the DMD. The static reflector may include a grating fixed at an angle suitable to reflect light in a desired pattern. In some embodiments, the static reflector is subdivided into multiple areas and each area is illuminated by a different light source (e.g., a different LED).

The light sources may be modulated to provide control of the lighting pattern produced via the static reflector.

In some embodiments of the headlamp disclosed a portion of the static reflector is moveable. In a first position, the moveable portion of the static reflector is positioned in front of the DMD. Thus, in the first position, the moveable portion of the static reflector reflects light in place of the DMD (e.g., the moveable portion of the static reflector provides high beam functionality). In a second position, the moveable portion of the static reflector is positioned to allow the DMD to reflect incoming light (e.g., the DMD provides high beam functionality). Embodiments may position the moveable portion of the static reflector to provide high beam functionality based on the temperature, external light conditions, or other environmental factors that may affect the operation of the DMD.

FIG. 1 shows a block diagram of an automotive headlamp 100 in accordance with various embodiments. The headlamp 100 includes a light source 102, a reflector 106, and projection optics 112. The light source 102 includes one or more LEDs 104 that project light onto the reflector 106. Some embodiments of the light source 102 may include light generation devices other than or in addition to LEDs. The light source 102 may include modulation circuitry that controls the output intensity one or more of the LEDs 104 by switching (e.g., pulse width modulating) a control signal to the LEDs 104 or by changing a drive current provided to the LEDs 104. For example, the modulation circuitry may provide individual control of each the output intensity of each of the LEDs 104.

Light generated by the light source 102 is projected onto the reflector 106. The reflector 106 includes a DMD 108 and a static reflector 110. The DMD 108 is one example of a spatial light modulator suitable for use in the headlamp 100. Some embodiments of the headlamp 100 may employ a liquid crystal on silicon (LCOS) device, a liquid crystal display (LCD) device, or other spatial light modulation technology in place of the DMD 108. Accordingly, the embodiments disclosed herein encompass headlamps that employ a variety of spatial modulation technologies including DMD, LCOS, LCD, etc.

Inclusion of the static reflector 110 in the reflector 106 provides a number of advantages. The static reflector 110 increases the active area of the reflector 106, which in turn increases etendue without increasing the area of the DMD 108. With the static reflector 110, a wider field of view and higher brightness may be provided by increasing the size of the light source 102 (e.g., increasing the number of LEDs 104 included in the light source 102). The static reflector 110 may be disposed adjacent to at least two sides of the DMD. Embodiments of the static reflector 110 may include a flat mirror, a curved mirror, and/or a Fresnel element that reflects light received from the light source 102.

Light reflected by the reflector 106 is directed to the projection optics 112. The projection optics 112 may be any lens or lens system that captures the light reflected by the reflector 106 and projects the captured light away from the headlamp 100, e.g., onto the roadway. In embodiments of the automotive headlamp 100, a single assembly of projection optics 112 (e.g., a single lens system) receives reflected light from both the DMD 108 and the static reflector 110 and projects the reflected light away from the headlamp 100. Thus, embodiments employ a single set of projection optics 112 for both the DMD 108 and the static reflector 110 rather than separate projection optics for the different reflectors as is conventional.

Figure 2:
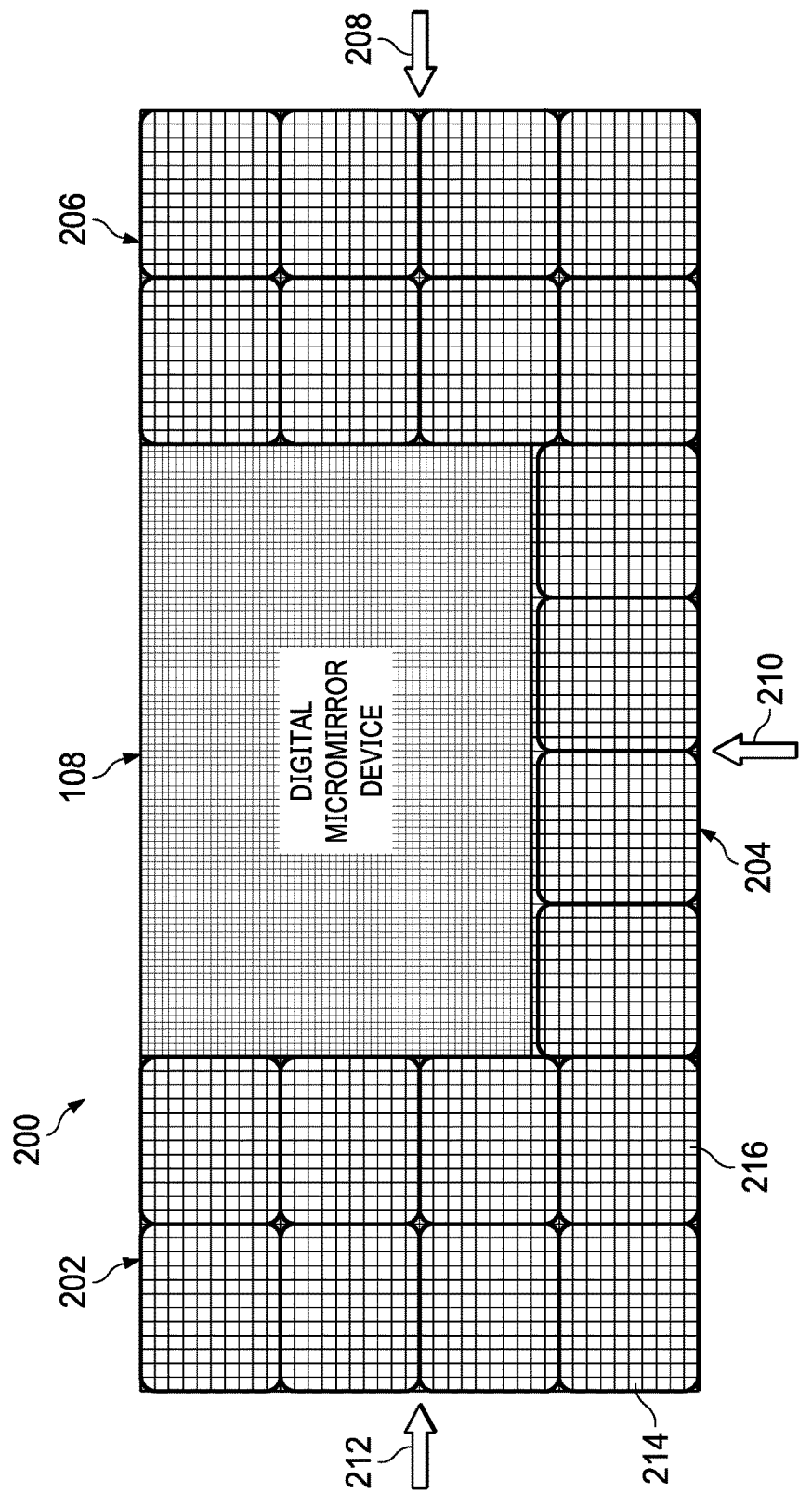
FIG. 2 shows a headlamp reflector that includes a digital micromirror device (DMD) and a static reflector in accordance with various embodiments.

FIG. 2 shows a headlamp reflector 200 that includes a DMD 108 and static reflectors 202, 204, and 206. The headlamp reflector 200 is an embodiment of the reflector 106, and the static reflectors 202, 204, and 206 are an embodiment of the static reflector 110. The area of the static reflectors 202 and 206 disposed on left and right sides of the DMD 108 is approximately equal. Accordingly, the arrangement of the static reflectors 202 and 206 may be described as symmetrical with respect to the DMD 108. In some embodiments, the static reflectors 202, 204, and 206 may be provided as a monolithic unit. In other embodiments, the static reflectors 202, 204, and 206 and/or sub-portions thereof may be provided as separate units.

The DMD 108 provides adaptive beam steering and shaping of the field of view by modulating incident light via the micromirrors. Limited beam adaptation may be provided using the static reflectors 202, 204, and 206 by modulating the light output of the light source 102 directed to the static reflectors 202, 204, and/or 206. For example, area 214 of the static reflector 202 may be illuminated by a first LED and area 216 of the static reflector 202 may be illuminated by a second LED, and light output of the first LED may differ from light output of the second LED in intensity and/or modulation to provide limited beam adaptation.

The light source 102 may direct light to different portions of the reflector 200 from different directions. For example, in FIG. 2, light 212 is directed to the static reflector 202 from a first direction, light 210 is directed to the static reflector 204 and the DMD 108 from a second direction, and light 208 is directed to the static reflector 206 from a third direction. An angle of reflection of the static reflectors 202, 204, and 206 and of the DMD 108 may be selected to direct light 208, 210, and 210 to the projection optics 112.

Figure 3:
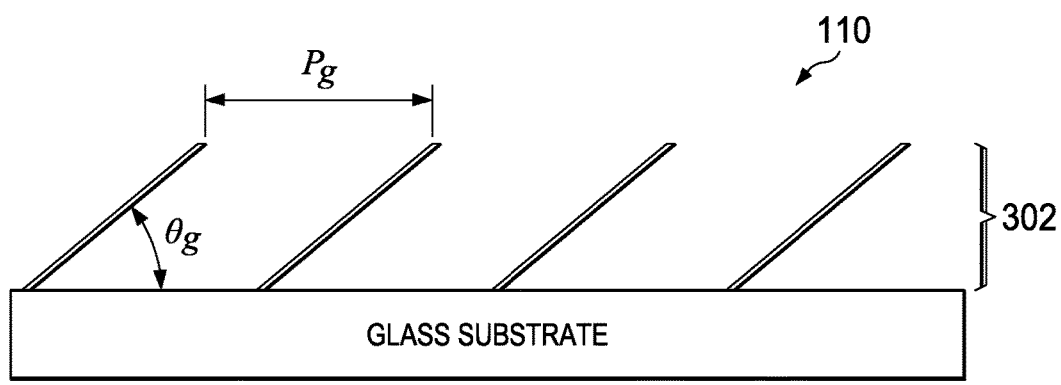
FIG. 3 shows detail of a static reflector suitable for use in a headlamp reflector with a DMD in accordance with various embodiments.

FIG. 3 shows detail of an embodiment of the static reflector 110 suitable for use in a headlamp reflector 106 with a DMD 108 in accordance with various embodiments. The static reflector 110 includes a reflective grating 302. In some embodiments, the pitch angle ($\theta_g$) of the reflective grating 302 may be about the same or greater than the angle of the mirrors of the DMD 108 in an "on" state. The grating pitch ($P_g$) (e.g., distance between grating apices) may be larger than the pitch of the mirrors in the DMD 108. In various embodiments, the pitch and angle of the reflective grating 302 may be uniform, or may vary across the static reflector 110. In some embodiments of the static reflector 110, the reflective grating 302 or a reflective material may be coplanar with the DMD 108, or disposed in a plane offset from a plane corresponding to the DMD 108. In various embodiments, the reflective grating 302 or a reflective material may be disposed on either side of or embedded with a glass substrate.

Figure 4:
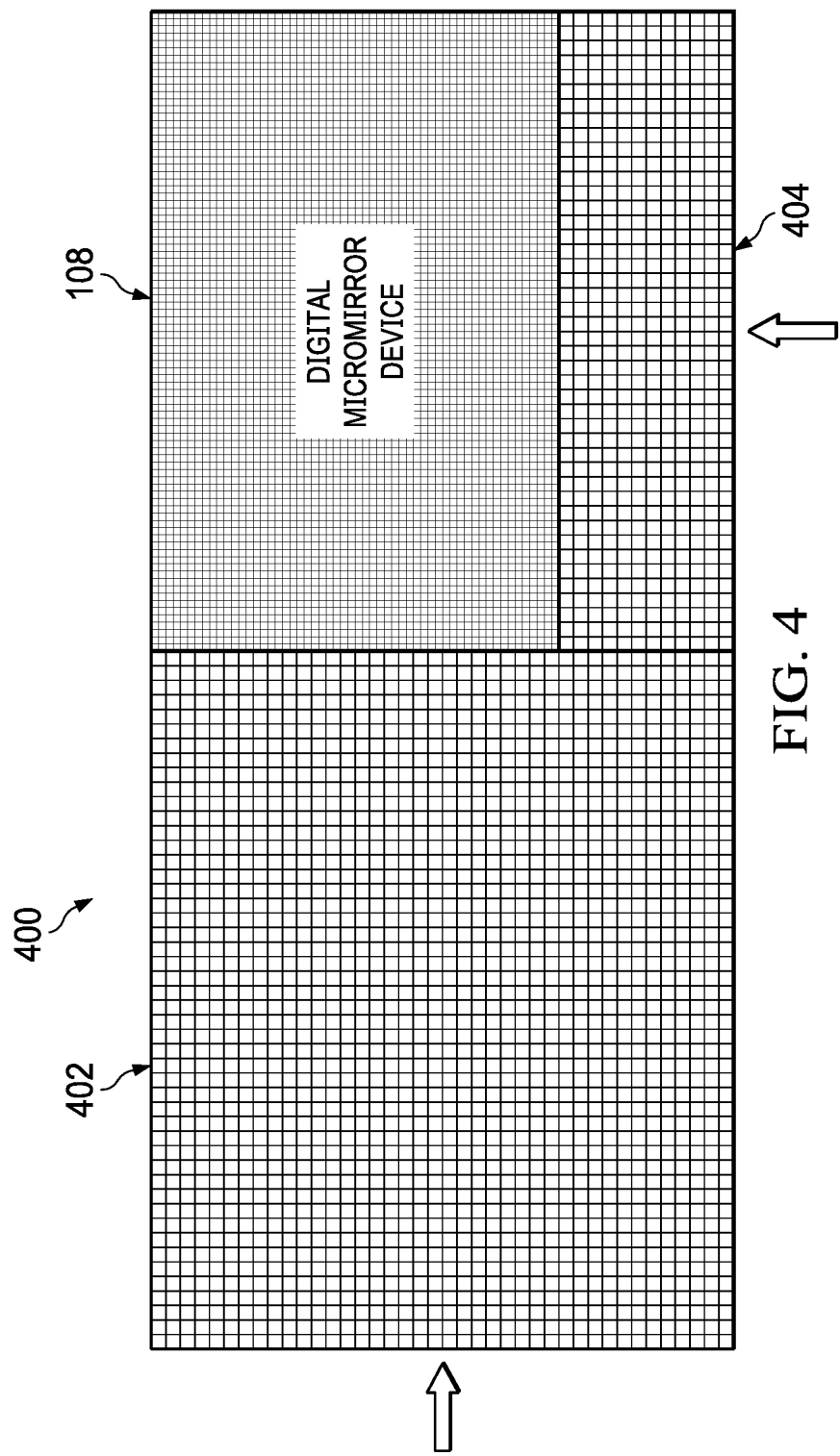
FIG. 4 shows a headlamp reflector that includes a digital micromirror device (DMD) and a static reflector in accordance with various embodiments.

Using embodiments of the headlamp reflector 200 to implement vehicular headlights, left and right headlamp beam overlay may cause the beam from the static reflectors 202, 204, and 206 to overlap with the image produced by the DMD 108 at some distance from the headlamps, depending upon the field of view. The overlap may reduce the effective addressable resolution on the road. FIG. 4 shows a headlamp reflector 400 that may reduce static reflector overlap and degradation of the effectiveness of the DMD 108. The headlamp reflector 400 includes a DMD 108 and static reflectors 402 and 404. The headlamp reflector 400 is an embodiment of the reflector 106, and the static reflectors 402 and 404 are an embodiment of the static reflector 110. The static reflector 402 is disposed on one side of the DMD 108 and the static reflector 404 is disposed below the DMD 108. The reflector 400 lacks a static reflector adjacent one side of the DMD 108. Accordingly, the arrangement of the static reflectors 402 and 404 may be described as asymmetrical with respect to the DMD 108. In some embodiments, the static reflectors 402 and 404 may be provided as a monolithic unit. In other embodiments, the static reflectors 402 and 404 may be provided as separate units.

The DMD 108 provides adaptive beam steering and shaping of the field of view by modulating incident light via the micromirrors. Limited beam adaptation may be provided using the static reflectors 402 and 404 by modulating the light output of the light source 102 directed to the static reflectors 402 and 404.

Figure 5A:
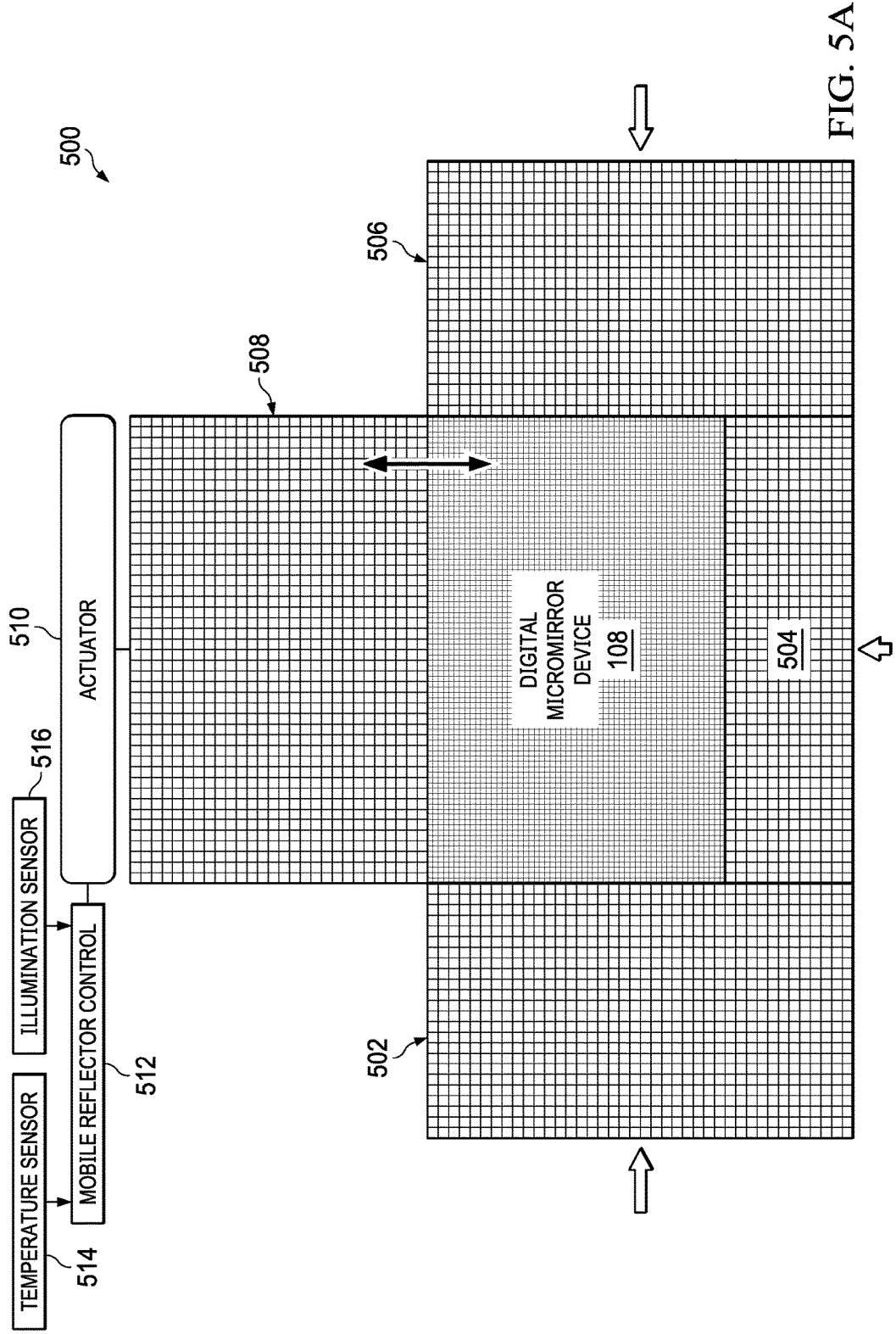
FIGS. 5A-5B show a headlamp reflector that includes a DMD and a mobile static reflector in accordance with various embodiments.
Figure 5B:
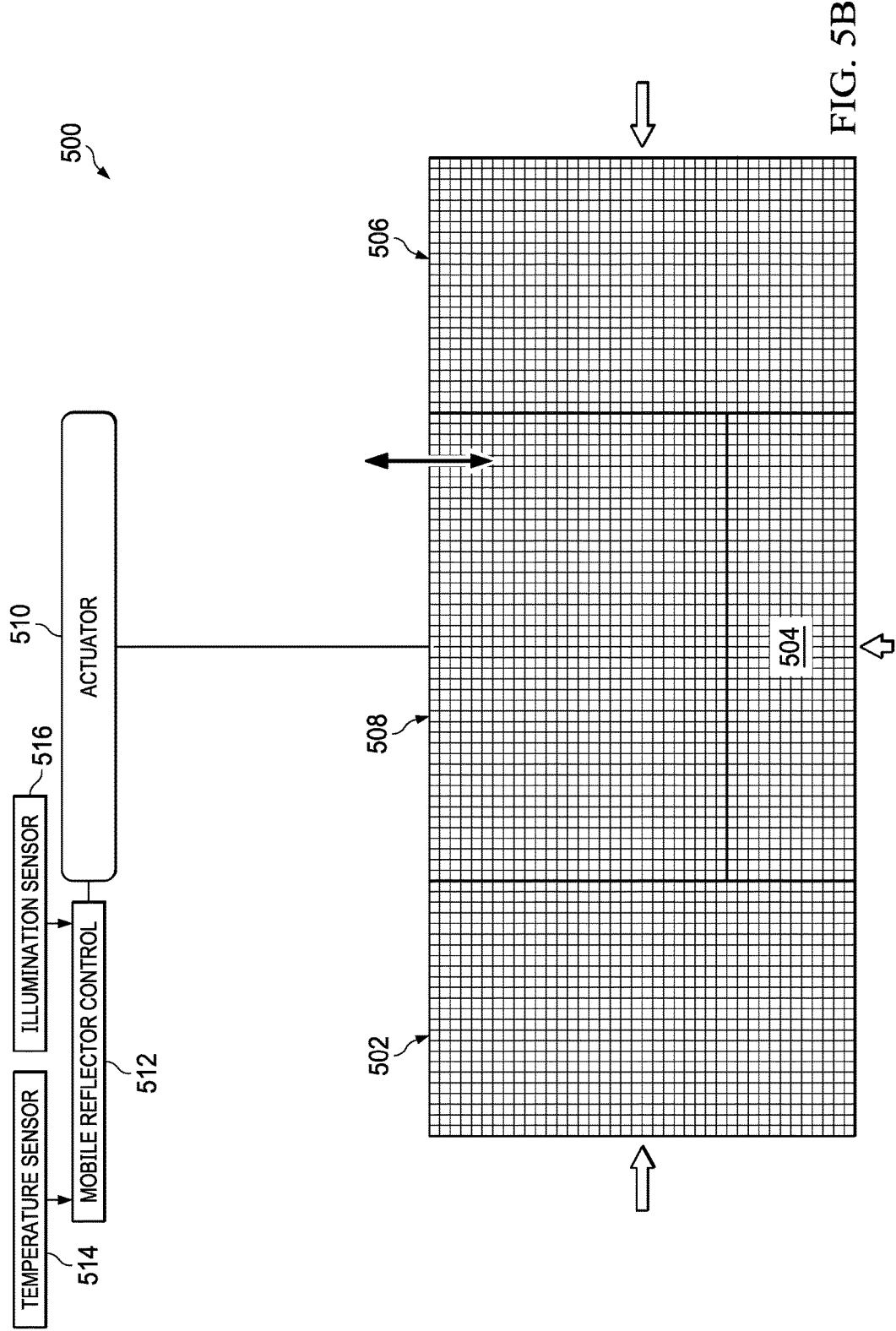

FIGS. 5A and 5B show a headlamp reflector 500 that includes a moveable static reflector in accordance with various embodiments. The headlamp reflector 500 includes a DMD 108, fixed static reflectors 502, 504, and 506, moveable static reflector 508, and actuator 510. The headlamp reflector 500 is an embodiment of the reflector 106, and the static reflectors 502, 504, 506, and 508 are an embodiment of the static reflector 110. In the illustrated embodiment of the reflector 500, a symmetrical arrangement of the static reflectors relative to the DMD 108 is shown in that the area of the static reflectors 502 and 56 disposed on left and right sides of the DMD 108 is approximately equal. In some embodiments, that relationship of the static reflectors to the DMD 108 may be asymmetrical (e.g., as shown in FIG. 4).

The static reflector 508 is moveable. In FIG. 5A, the static reflector 508 is positioned to enable use of the DMD 108 to reflect light generated by the light source 102. In FIG. 5B, the static reflector 508 is positioned to disable use of the DMD 108 and to enable the static reflector 508 to reflect light generated by the light source 102. The static reflector 508 is coupled to the actuator 510. The actuator 510 may be a solenoid or other device capable of moving the static reflector 508 between at least two positions. The actuator is coupled to mobile reflector control circuitry 512. The mobile reflector control circuitry 512 monitors environmental conditions, such as temperature and/or external illumination, and controls the actuator 510 based on measurements of the environmental conditions. The mobile reflector control circuitry 512, or a portion thereof, may disposed remotely from the reflector 500 and the headlamp 100. For example, the mobile reflector control circuitry 512 may include or be coupled to sensors, such as temperature sensor 514 and/or illumination sensor 516, that are disposed in the reflector 500 and/or in the headlamp 100 while circuitry that processes the output of the sensors (e.g., digitizers, microcontrollers, etc.) is disposed outside of the headlamp 100 (e.g., in the engine compartment, vehicle cabin, etc.).

In some embodiments, the mobile reflector control circuitry 512 applies the temperature sensor 514 to measure the temperature of the DMD 108 or the temperature proximate the DMD 108, and if the measured temperature does not exceed a predetermined temperature threshold (e.g., 105 degrees Celsius), then the mobile reflector control circuitry 512 may assert control to the actuator 510 to cause the actuator 510 to position the static reflector 508 as shown in FIG. 5A. If the temperature of the DMD 108 or the temperature proximate the DMD 108 exceeds the predetermined temperature threshold, as may occur in high ambient temperature conditions such as desert driving, then the mobile reflector control circuitry 512 may assert control to the actuator 510 to cause the actuator 510 to position the static reflector 508 as shown in FIG. 5B. Similarly, if the level of illumination does not exceed a predetermined illumination threshold, then the mobile reflector control circuitry 512 may assert control to the actuator 510 to cause the actuator 510 to position the static reflector 508 as shown in FIG. 5A. If the level of illumination exceeds the predetermined illumination threshold (as in daylight conditions presenting high sunlight), then mobile reflector control circuitry 512 may assert control to the actuator 510 to cause the actuator 510 to position the static reflector 508 as shown in FIG. 5B.

In some embodiments of the headlamp 500, the default position of the static reflector 508 may be as shown in FIG. 5B, with the static reflector 508 covering the DMD 108. For example, a spring coupled to the static reflector 508 may position the static reflector 508 to cover the DMD 108 in the absence of force applied by the actuator 510 to move the static reflector 508 away from the DMD 108 as in FIG. 5A. The DMD 108 and associated circuitry may powered off while the static reflector 508 is positioned to cover the DMD 108.

Figure 6:
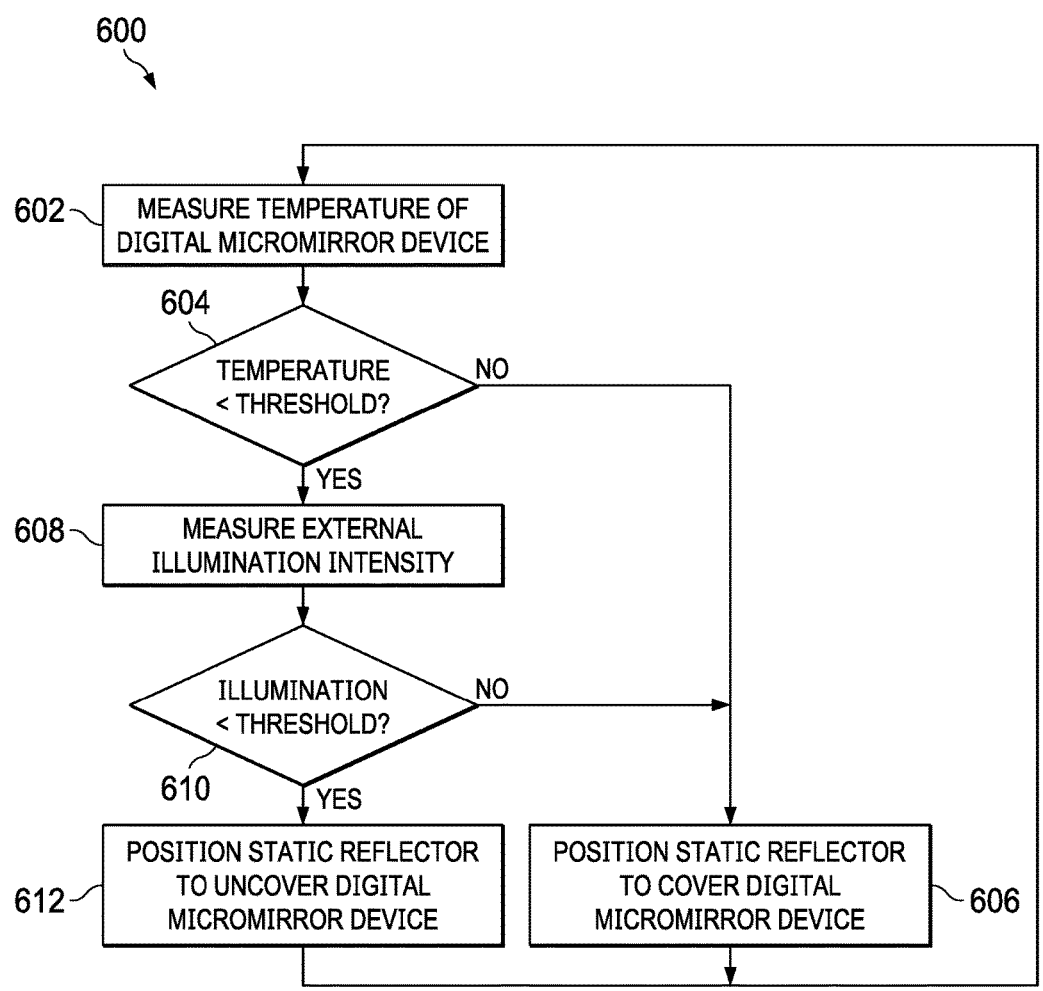
FIG. 6 shows a flow diagram for a method for controlling the position of a moveable portion of a static reflector in accordance with various embodiments.

FIG. 6 shows a flow diagram for a method 600 for controlling the position of a moveable portion of a static reflector in accordance with various embodiments. Though depicted sequentially as a matter of convenience, at least some of the actions shown can be performed in a different order and/or performed in parallel. Additionally, some implementations may perform only some of the actions shown. In some implementations, at least some of the operations of the method 600 can be implemented by the headlamp 500.

In block 602, the temperature sensor 514 disposed in the headlamp 500 is measuring the temperature of the DMD 108 or measuring the temperature of the headlamp 500 proximate the DMD 108.

In block 604, the mobile reflector control circuitry 512 compares the output of the temperature sensor 514 to a temperature threshold value. The temperature threshold value represents a temperature at or below which the static reflector 508 may be positioned to allow the DMD 108 to reflect light. For example, at temperatures below 105° Celsius the static reflector 508 may be positioned to allow the DMD 108 to reflect light, while at temperatures ≥105° Celsius the static reflector 508 may be positioned to cover the DMD 108 and to reflect light in place of the DMD 108.

If, in block 604, the temperature measured by the temperature sensor 514 is not less than the temperature threshold value, then, in block 606, the mobile reflector control circuitry 512 asserts control to the actuator 510 to cause the actuator 510 to position the static reflector 508 to cover the DMD 108 as shown in FIG. 5B.

If, in block 604, the temperature measured by the temperature sensor 514 is less than the temperature threshold value, then, in block 608, the illumination sensor 516 disposed in or proximate to the headlamp 500 measures the intensity of illumination external to the headlamp 500.

In block 610, the mobile reflector control circuitry 512 compares the output of the illumination sensor 516 to an illumination threshold value. The illumination threshold value represents an illumination intensity at or below which the static reflector 508 may be positioned to allow the DMD 108 to reflect light. For example, at illumination intensities below 100,000 lux the static reflector 508 may be positioned to allow the DMD to reflect light, while at illumination intensities ≥100,000 lux the static reflector 508 may be positioned to cover the DMD 108 and to reflect light in place of the DMD 108.

If, in block 610, the illumination measured by the illumination sensor 516 is not less than the illumination threshold value, then, in block 606, the mobile reflector control circuitry 512 asserts control to the actuator 510 to cause the actuator 510 to position the static reflector 508 to cover the DMD 108 as shown in FIG. 5B.

If, in block 610, the illumination measured by the illumination sensor 516 is less than the illumination threshold value, then, in block 612, the mobile reflector control circuitry 512 asserts control to the actuator 510 to cause the actuator 510 to position the static reflector 508 to uncover the DMD 108 as shown in FIG. 5A.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A headlamp, comprising:
   a digital micromirror device (DMD) reflector comprising:
      a DMD; and a static reflector disposed on a plurality of sides of the DMD;
   a light source disposed to illuminate the DMD reflector;
   projection optics configured to project light reflected by the DMD and light reflected by the static reflector via a same lens system, the static reflector: being disposed to reflect light from the light source to the projection optics; and comprising at least one of a flat mirror, a curved mirror or a Fresnel element; and
   control circuitry configured to: monitor a temperature of the DMD; and move a portion of the static reflector from a first position to a second position responsive to the temperature of the DMD being less than a limit.

2. The headlamp of claim 1, wherein the static reflector comprises a static reflective grating with an angle that is at least as large as an angle of mirrors of the DMD.

3. The headlamp of claim 1, wherein the DMD is laterally centered with respect to the static reflector, such that area of the static reflector adjacent each lateral edge of the DMD is equal.

4. The headlamp of claim 1, wherein the DMD is laterally offset with respect to the static reflector, such that only one lateral edge of the DMD is adjacent to the static reflector.

5. The headlamp of claim 1, wherein:
   in the first position, the static reflector blocks the DMD from light exposure; and
   in the second position, the DMD is exposed to light.

6. The headlamp of claim 1, wherein the limit is a first limit, and the control circuitry is configured to:
   monitor illumination external to the headlamp; and
   move the portion of the static reflector from the first position to the second position responsive to an intensity of the illumination external to the headlamp being less than a second limit.

7. The headlamp of claim 1, wherein the control circuitry is configured to modulate an intensity of light produced by the light source that is directed to the static reflector.

8. The headlamp of claim 1, wherein the portion is a mobile portion, and the static reflector comprises:
   a fixed portion; and
   an actuator configured to move the mobile portion from the first position to the second position.

9. The headlamp of claim 8, wherein: in the first position, the mobile portion of the static reflector is disposed to block the DMD from light exposures; and in the second position, the mobile portion of the static reflector is disposed to enable exposure of the DMD to light.

10. The headlamp of claim 8, wherein the control circuitry is configured to:
    trigger the actuator to move the mobile portion of the static reflector from the first position to the second position responsive to the temperature of the DMD being less than the limit.

11. The headlamp of claim 8, wherein the limit is a first limit, and the control circuitry is configured to:
    monitor light external to the headlamp; and
    trigger the actuator to move the mobile portion of the static reflector from the first position to the second position responsive to an intensity of the light external to the headlamp being less than a second limit.

12. The headlamp of claim 8, wherein the static reflector comprises a static reflective grating with an angle that is at least as large as an angle of mirrors of the DMD.

13. The headlamp of claim 8, wherein the DMD is laterally centered with respect to the fixed portion of the static reflector, such that area of the fixed portion of the static reflector adjacent each lateral edge of the DMD is equal.

14. The headlamp of claim 8, wherein the DMD is laterally offset with respect to the fixed portion of the static reflector, such that only one lateral edge of the DMD is adjacent to the fixed portion of the static reflector.

15. The headlamp of claim 8, wherein the control circuitry is configured to modulate an intensity of light produced by the light source that is directed to the static reflector.

16. A headlamp, comprising:
    a reflector module comprising: a spatial light modulator; and a static reflector disposed on a plurality of sides of the spatial light modulator;
    a light source disposed to illuminate the reflector module;
    projection optics configured to project light from the spatial light modulator and light reflected by the static reflector via a same lens system, the static reflector: being disposed to reflect light from the light source to the projection optics; and comprising at least one of a flat mirror, a curved mirror or a Fresnel element; and
    control circuitry configured to: monitor a temperature of the spatial light modulator; and move a portion of the static reflector from a first position to a second position responsive to the temperature of the spatial light modulator being less than a limit.

17. The headlamp of claim 16, wherein: in the first position, the portion of the static reflector blocks the spatial light modulator from light exposure; and in the second position, the portion of the static reflector enables exposure of the spatial light modulator to light.

18. The headlamp of claim 16, further comprising an actuator coupled to the portion of the static reflector, the actuator configured to move the portion of the static reflector from the first position to the second position.

19. The headlamp of claim 18, wherein the control circuitry is configured to:
    trigger the actuator to move the portion of the static reflector from the first position to the second position responsive to the temperature of the spatial light modulator being less than the limit.

20. The headlamp of claim 16, wherein the limit is a first limit, and the control circuitry is configured to:
    monitor illumination external to the headlamp; and
    move the portion of the static reflector from the first position to the second position responsive to an intensity of the illumination external to the headlamp being less than a second limit.

21. The headlamp of claim 16, wherein the control circuitry is configured to modulate an intensity of light produced by the light source that is directed to the static reflector.

* * * * *